Figure 1:
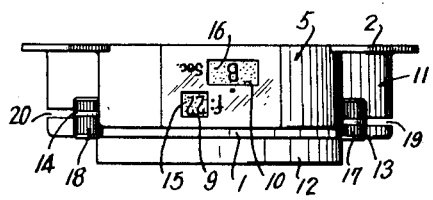

Nov. 11, 1958    TATSUO KOBAYASHI ET AL    2,859,675
DEVICE FOR REPRESENTING GRADUATIONS FOR
EXPOSURE IN A BINOCULAR REFLEX CAMERA
Filed Aug. 21, 1953    2 Sheets-Sheet 1

Nov. 11, 1958
TATSUO KOBAYASHI ET AL
2,859,675
DEVICE FOR REPRESENTING GRADUATIONS FOR
EXPOSURE IN A BINOCULAR REFLEX CAMERA
Filed Aug. 21, 1953
2 Sheets-Sheet 2
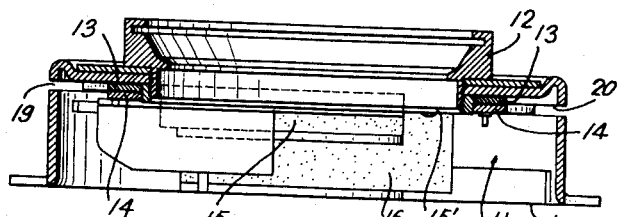
FIG.5.
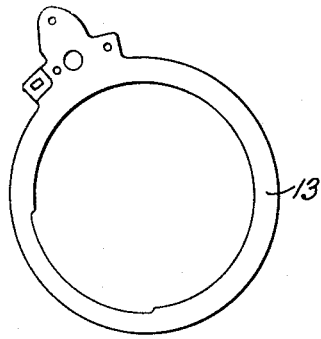
FIG.8.
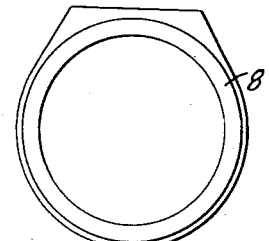
FIG.6.
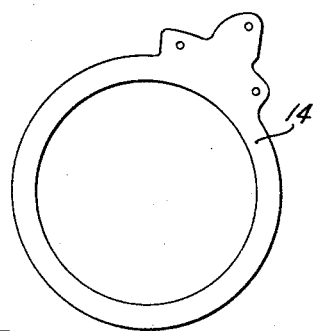
FIG.9.
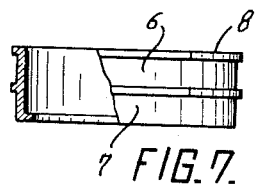
FIG.7.
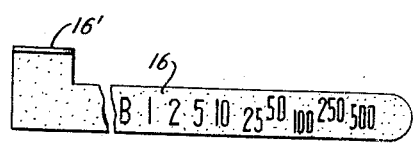
FIG.12.
FIG.13.
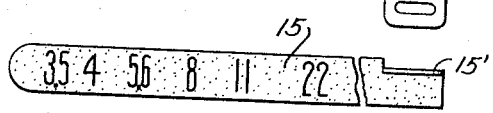
FIG.10.
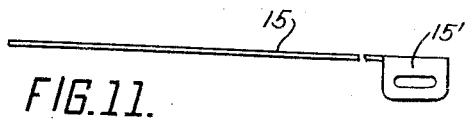
FIG.11.

United States Patent Office 2,859,675
Patented Nov. 11, 1958

2,859,675

DEVICE FOR REPRESENTING GRADUATIONS FOR EXPOSURE IN A BINOCULAR REFLEX CAMERA

Tatsuo Kobayashi, Amagasaki, and Kaichi Ikeda, Nishinomiya, Japan, assignors to Chiyoda Kogaku Seiko Kabushiki Kaisha, Osaka, Japan, a corporation of Japan Application August 21, 1953, Serial No. 375,704
Claims priority, application Japan November 6, 1952
1 Claim. (Cl. 95—64)

The present invention relates to a device for representing graduations for the exposure in photographing apparatus, particularly in the binocular reflex camera.

In the usual binocular reflex camera provided with means for representing graduations for the exposure, particularly for adjusting the rate of exposure while said camera is held in the photographing position, it is an ordinary practice to provide such graduations for the exposure, i. e. of an iris and of shutter time, around the lower half portion of the external periphery of the lens-cylinder, or alternatively illuminate out said graduations on the sheets of windows formed for instance in the top periphery of the camera casing. Those graduations are, however, not only difficult to read and liable to cause misreading, but also it is required to read them each time after the position of the camera has been suitably changed. In addition to the above disadvantages, a most serious and common defect in such devices is that the mechanisms in said devices for making such graduations visible from above are extremely intricate and costly because of the necessity of a complicated gearing and/or electrical means for transmitting those graduations provided in the lower portion of the camera to the top portion thereof. Such are the outstanding disadvantages in those prior devices.

The principal object of the present invention, therefore, is to overcome those disadvantages more or less inherent in the prior devices.

In order to accomplish the aforementioned purpose, it was endeavored to adopt the simplest possible mechanism in order to eliminate the above-mentioned complex mechanisms. According to this invention, the apparatus comprises a casing with two peep windows formed in the top portion of the casing, which is constructed to perfectly fit around the periphery of the lens cylinders, tapes having graduations for the iris and shutter time, a guide ring having two grooves formed thereon along which said two tapes slide, two operable lever rings and knobs for actuating said lever rings, the graduated tapes being adapted to be directly moved along the grooves of the guide ring by merely actuating the operable lever rings by the knobs so that the graduations on said tapes may be viewed through the windows.

Figure 3:
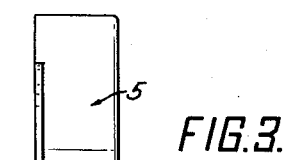
Figure 2:
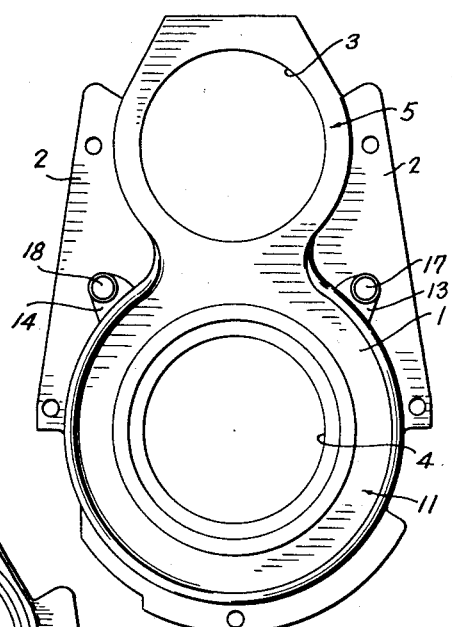
Figure 4:
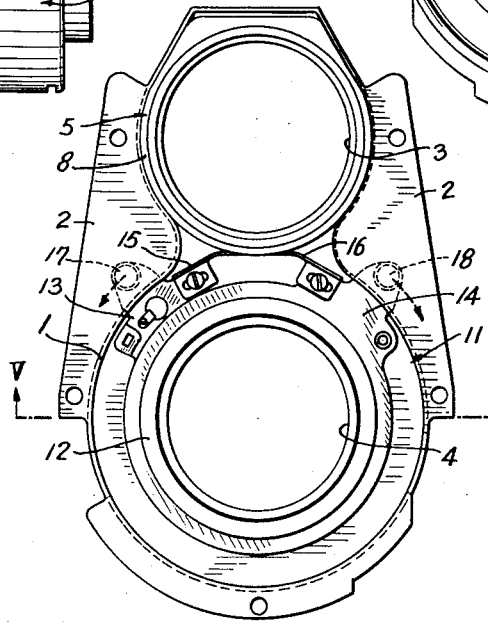

Other objects and characteristics of the present invention will be apparent in the following detailed description of an embodiment, by way of example, of the invention with reference to the accompanying drawings, of which Fig. 1 is a plan view of the main casing;
Fig. 2 is an elevation thereof;
Fig. 3 is a side view thereof;
Fig. 4 is a back view thereof;
Fig. 5 is a sectional view along the line V—V of Fig. 4;
Fig. 6 is a plan view of a guide annular piece;
Fig. 7 is a side view of the guide annular piece, showing its half portion in section;
Fig. 8 is a plan view of an iris-operating lever-ring;
Fig. 9 is a plan of a shutter lever ring;
Fig. 10 is a plan of a graduated tape for iris;
Fig. 11 is a side view of the graduated tape for iris;
Fig. 12 is a plan view of a graduated tape for shutter-time; and
Fig. 13 is a side view of the graduated tape for shutter-time.

In the drawings, 1 is a main casing formed to fit to the lens cylinders of the camera and secured to the lens-shutter holder at 2. On the surface of the main casing 1, there are formed two openings, one 3 for the sighting lenses and another for the photographing lenses 4. On the upper half portion 5 is inserted an irregular shaped guide ring 8 having grooves 6 and 7. Windows 9 and 10 are formed on the top portion of the casing. On a ring piece 12 inserted in the lower half portion 11 are rotatably mounted two operable lever rings 13, 14 respectively for an iris and for a shutter time. A graduated tape for iris 15 and another graduated tape for shutter time 16, each consisting of flexible material having required graduations, are fixed respectively at one end to the ring pieces 13, 14 with respective tongue portions 15', 16'. The flexible portions 15, 16 are introduced respectively in the grooves 6, 7 formed in the guide ring 8, knobs 17, 18 for respective operable lever rings 13, 14 being arranged to project out of sliding grooves 19, 20 on both sides of the main casing 1.

When a picture is to be taken, the knobs 17, 18 are made to slide respectively along the sliding grooves 19, 20 in the direction of arrows in Fig. 4, while the object to be photographed is being aimed at from above, which sets the motion of the graduated tapes 15, 16 along the grooves 6, 7 of guide ring 8, and thereby the figures of the graduations presenting themselves through the windows 9, 10 gradually. Hence, the necessary adjustment for the iris and shutter time may be performed, without changing the photographing position. Therefore not only the afore-said well known disadvantages in regard to the photo taking time may be overcome, but also the advantages, including, of course, simplicity of the construction, elimination of misreading and easy reconstruction because it may be attached to the usual camera quite easily, may be obtained.

Although a specific embodiment of the invention has been shown and described, it will be understood that it is but illustrative and that various modifications may be made therein without departing from the scope and spirit of the invention as defined in the appended claim.

What is claimed:

In a twin lens reflex type camera equipped with adjusting elements for the exposure, graduations for which are made visible from above while said camera is being held in the photographing position, the combination comprising a casing with two windows cut through the top portion thereof, said casing being constructed to perfectly fit to the lens cylinders of the camera, two graduated tapes for the iris and shutter timing, a guide ring having two grooves formed in parallel in the periphery thereof along which said tapes are adapted to slide respectively, two operable lever rings and two knobs for actuating said lever rings, one end of each of said graduated tapes being fixed respectively to the operable lever rings, said graduated tapes being adapted to be directly moved along said grooves of the guide ring by merely actuating the operable lever rings by the knobs so that the graduations on said tapes may be viewed through the windows.

References Cited in the file of this patent

UNITED STATES PATENTS

| 2,241,020 | Nerwin | May 6, 1941 |
| 2,342,819 | Priesemann | Feb. 29, 1944 |

FOREIGN PATENTS

| 586,844 | Germany | Oct. 26, 1933 |
| 666,365 | Germany | Oct. 18, 1938 |